US009848025B2

(12) United States Patent
Goldin et al.

(10) Patent No.: US 9,848,025 B2
(45) Date of Patent: Dec. 19, 2017

(54) DATA TRANSMISSION VIA A HIGH FREQUENCY RADIO BAND

(71) Applicant: Services Development Company LLC, Chicago, IL (US)

(72) Inventors: Alexey Goldin, Chicago, IL (US); John Hutchings, Hadley, MA (US); Mikhail Malyshev, Chicago, IL (US)

(73) Assignee: Services Development Company LLC, Chicago, IL (US)

( * ) Notice: Subject to any disclaimer, the term of this patent is extended or adjusted under 35 U.S.C. 154(b) by 0 days.

(21) Appl. No.: 14/967,246

(22) Filed: Dec. 11, 2015

(65) Prior Publication Data
US 2016/0173360 A1 Jun. 16, 2016

Related U.S. Application Data

(60) Provisional application No. 62/091,314, filed on Dec. 12, 2014.

(51) Int. Cl.
*H04L 29/06* (2006.01)
*H04L 29/08* (2006.01)
*H04L 12/18* (2006.01)

(52) U.S. Cl.
CPC .......... *H04L 65/4076* (2013.01); *H04L 67/18* (2013.01); *H04L 12/1804* (2013.01); *H04L 12/189* (2013.01); *H04L 12/1809* (2013.01)

(58) Field of Classification Search
CPC ............. H04L 12/1804; H04L 12/1809; H04L 12/189; H04L 67/18; H04L 65/4076; H04L 43/16; G01S 13/0218; H04B 17/309; H04B 7/22
See application file for complete search history.

(56) References Cited

U.S. PATENT DOCUMENTS

| 5,230,076 A * | 7/1993 | Wilkinson | H04B 17/309 375/133 |
| 5,321,750 A | 6/1994 | Nadan | |
| 5,543,806 A | 8/1996 | Wilkinson | |
| 5,778,317 A * | 7/1998 | Kaminsky | H04W 16/14 455/447 |
| 6,049,306 A * | 4/2000 | Amarillas | H01Q 3/08 342/359 |
| 9,136,938 B1 | 9/2015 | Babich | |
| 9,215,726 B1 * | 12/2015 | Adams | H04W 72/10 |
| 2011/0231879 A1 | 9/2011 | White et al. | |

(Continued)

FOREIGN PATENT DOCUMENTS

RU 2429494 C1 9/2011

OTHER PUBLICATIONS

MICOM-H HF-SSB transceiver owner's guide, Oct. 2000, 79 pages.*

(Continued)

*Primary Examiner* — Thai Vu
(74) *Attorney, Agent, or Firm* — Banner & Witcoff, Ltd.

(57) ABSTRACT

Systems and methods for communicating information within a business organization network using a one or more communication bands on a HF communication network. A computer device may be used to control communication by selecting a frequency band and/or frequency at which communication may take place to optimize latencies to at or near the physical limitation of HF radio wave communication over long distances.

16 Claims, 10 Drawing Sheets

(56) References Cited

U.S. PATENT DOCUMENTS

| | | | |
|---|---|---|---|
| 2011/0264578 A1 | 10/2011 | Chapman et al. | |
| 2012/0056785 A1 | 3/2012 | Jovicic et al. | |
| 2012/0309330 A1* | 12/2012 | Lamy-Bergot | H04L 5/06 455/101 |
| 2013/0274936 A1 | 10/2013 | Donahue et al. | |
| 2014/0169199 A1 | 6/2014 | Lamy-Bergot et al. | |

OTHER PUBLICATIONS

Kallgren, Donald G., Internet Protocol over HF: BLOS Experience during Exercise Allied Warrior '05, published Jan. 12, 2006 for the High Frequency Industry Association (HFIA) Meeting in San Diego, CA, 20 pages.

Laughlin, Gregory et al., Information Transmission Between Financial Markets in Chicago and New York, Feb. 26, 2013, 18 pages.

Kawanishi, Tetsuya et al., Low latency data transmision using wireless and wired communications, Proc. International Conference on Space Optical Systems and Applications (ICSOS) 2012, 9-1, Ajaccio, Corsica, France, Oct. 9-12 (2012), © ICSOS 1012, 5 pages.

High Frequency Communications—An Introductory Overview—Who, What, and Why?, Aug. 13-15, 2012, 67 pages.

Haldren III, Harold A., Running head: Software-Defined Radios, Studies in Software-Defined Radio System Implementation, Liberty University, Spring 2014, 40 pages.

Cowling, Scott, Hands-On Software Defined Radio, Getting Started with Software Defined Radios—or—"Now that I can spell SDR, what now?", © 2008 Scott Cowling WA2DFI, 2008 Dayton Hamvention SDR Forum, 88 pages.

Johnson, Eric E., New Mexico State University, Interactions Among Ionospheric Propagation, HF Modems, and Data Protocols, published in the Proceedings of the 2002 Ionospheric Effects Symposium, Alexandria, VA, 2002, 8 pages.

Hood, Tomas, MUF, LUF, and FOT—The Basics of the Maximum Usable Frequency, Dec. 8, 2015, HFRadio.org—Propagation—Maximum Usable Frequency, MUF Basics—high frequency radio, http://hfradio.org/muf_basics.html, © 2003-2004 Tomas Hood (NW7US), 2 pages.

Stringer, Michael, HF-DSR An Implementation of Dynamic Source Routing Designed for HF Ad-Hoc Networks, RIT Computer Science Masters Project Proposal, May 24, 2004, 12 pages.

Aviat Networks, Dec. 8, 2015, Low latency microwave High Frequency Trading, Ultra Low-Latency Microwave, http://www.aviatnetworks.com/solutions/low-latency-microwave/, © 2013 Aviat Networks, 2 pages.

Straw, Dean, Strategies Using Propagation Predictins for DXing and Contesting, A Presentation to Dayton Hamvention, May 21, 2005, Dayton, OH, published by AARL, 64 pages.

Stroobandt, Serge, Dec. 8, 2015, Online HF Propagation Prediction, Serge Stroobandt, ON4AA, © 2014-2015, CC BY-NC-SA, Markdown, makefile, 3 pages.

Straw, Dean, ARRL, What is VOACAP Trying to Tell Me?, A Presentation to the Yankee Clipper Contest Club, Feb. 1, 2003, Milford, CT, 41 pages.

Harris Corp., Radio Communications in the Digital Age, vol. 1, HF Technology, Edition 2, Harris® assured communications™, First Edition: Sep. 1996, Second Edition: Oct. 2005, © Harris Corporation 2005, 98 pages.

Australian Communications and Media Authority (acma), Radio propagation Fact sheet, FS 79—Oct. 2009, 2 pages.

Willebrand, Heinz, Ultra Low Latency Wireless Point-to-Point Networks, White Paper, Lightpointe™ Wireless, LightPointe Communications, Inc., San Diego, CA, Oct. 15, 2013, 12 pages.

VOACAP Quick Guide: VOACAP Frequently Asked Questions, Dec. 8, 2015, VOACAP Frequently Asked Questions (Revised Feb. 22, 1996), http://www.voacap.com/itshfbc-help/voacap-faq.html, 5 pages.

VOACAP Quick Guide: VOACAP Overview, Dec. 8, 2015, http://www.voacap.com/overview.html, 2 pages.

Perkiömäki, Jari, VOACAP Propagation Planner, A Planning Tool for Contesters and DXers, www.voacap.com/planner.html, Oct. 21, 2012, 21 pages.

Isode, Dec. 2, 2014, Why IP over HF Radio should be Avoided, http://www.isode.com/whitepapers/ip-over-stanag-5066.html, © 2002-2014 Isode Ltd., 8 pages.

Adegoke, A.S. et al., Effects of Propagation Delay on Signal Transmission, The Pacific Journal of Science and Technology, vol. 9, No. 1, May-Jun. 2008, http://www.akamaiuniversity.us/PJST.htm, 7 pages.

Mar. 11, 2016—(WO) International Search Report and Written Opinion—App PCT/US15/65368.

\* cited by examiner

DATA TRANSMISSION VIA A HIGH FREQUENCY RADIO BAND

This application claims priority to Provisional Application, U.S. Ser. No. 62/091,314, filed Dec. 12, 2014 which is incorporated herein by reference in its entirety.

BACKGROUND OF THE INVENTION

Financial markets or exchanges may provide publically available market data via public networks, such as the Internet. In many cases, business organizations may analyze one or more financial markets to determine metrics useful to their business operations. This information may be time critical and may be subject to one or more sources of delay when being communicated between computing systems that may be located at different geographical locations. As such, it is desirable to determine method of communicating time critical information with a minimum of delays.

High Frequency (HF) radio communication has been used for voice and/or data communication via radio frequency (RF) electromagnetic waves at frequencies between about 3 MHz and 30 MHz that are within a shortwave band of radio wave frequencies. For example, such communication at these HF frequencies is often referred to a shortwave radio communication. Radio waves in HF band may be used for long distance communication, often by reflecting the transmitted radio waves off the ionosphere.

SUMMARY OF THE INVENTION

In general, the systems and methods discussed herein may be used to provide long range transmission of electronic data. More specifically, the systems and methods discussed herein may be used to communication information corresponding to metrics and analytics that may be used internally by a business organization to manage risks or other such internal business processes. For example, an illustrative business organization may provide services to affiliated research, technology, and investment companies within the same organization. As such, the illustrative research and technology firm may develop internal proprietary metrics and analytics to manage risk. An illustrative transmission system may be developed according to certain embodiments to efficiently communicate the proprietary metrics and analytics within the organization. For clarity, the transmission system would not be used to communicate publically available information provided by a stock market or derivatives market, including any transaction information that may originate from an exchange.

In some cases, the transmission system may include one or more radio stations configured to transmit on one of four requested frequency bands in the range 3-30 MHz. In doing so, only a single frequency may be used at any one time as determined based, at least in part, on prevailing ionospheric propagation conditions. As such, the illustrative systems may monitor one or more environment, atmospheric and/or solar conditions to determine whether to switch frequencies, as needed. In many cases, such radio stations may not be used for omnidirectional transmission but rather may transmit in a directional manner. For example, as in an illustrative test set-up, a radio station was configured to be typically pointed in the general azimuthal direction of 54 degrees from true North.

The systems and methods discussed herein encompass the exploration and subsequent development of a novel method to achieve low latency data communication over a narrow bandwidth channel in the High Frequency radio band. A communication protocol stack is designed, complete with modulation and coding, to optimize latency over other parameters, such as throughput and reliability. The resulting data communication system may allow for low-latency HF communication over long distances. In some embodiments, the low-latency HF communication may allow for optimized latency to be achieved so that latencies experienced in the communication system are as close as possible to the physical limitation of radio waves propagation delays.

DETAILED DESCRIPTION

The systems and methods discussed herein encompass the exploration and subsequent development of a novel method to achieve low latency data communication over a narrow bandwidth channel in the High Frequency radio band. A communication protocol stack is designed, complete with modulation and coding, to optimize latency over other parameters, such as throughput and reliability. The resulting data communication system may allow for low-latency HF communication over long distances. In some embodiments, the low-latency HF communication may allow for an optimized, or nearly optimized, latency to be achieved so that latencies experienced in the communication system are as close as possible to the physical limitation of radio waves propagation delays.

Figure 1:
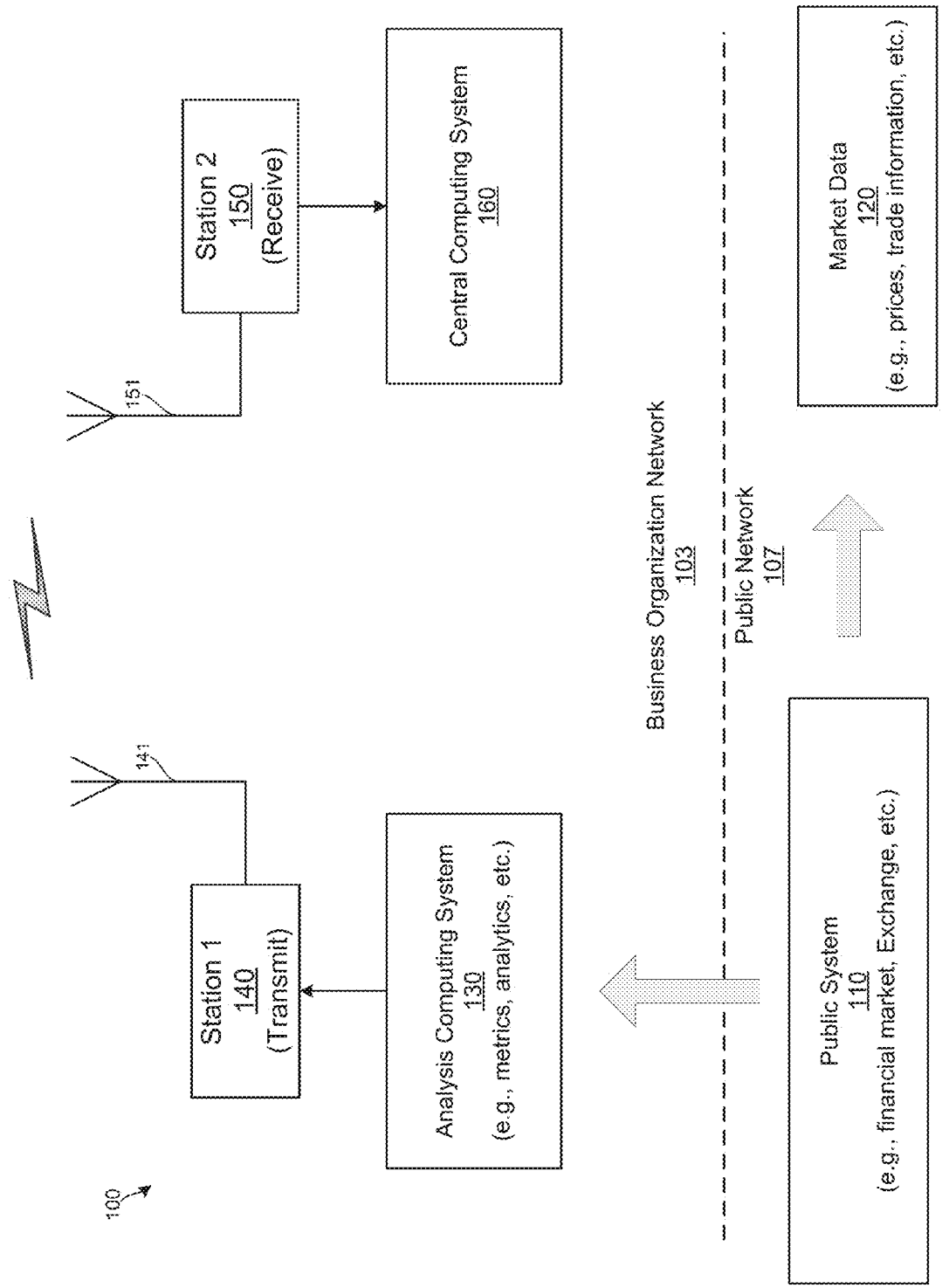
FIG. 1 shows an illustrative system for determining metrics associated with a public system and communicating the metrics within a business organization via HF radio wave communication according to some embodiments.

FIG. 1 shows an illustrative system 100 for determining metrics associated with a public system and communicating the metrics within a business organization via HF radio wave communication according to some embodiments. In some cases, the larger system may include a public network 107 including a publically accessible computing system (e.g., the public system 110), such as a financial network computing system, a financial exchange and/or the like. This public system 110 may include a marketplace where members of the public, business organizations and/or the like may buy or sell goods, services, and/or financial instruments. As part of the marketplace, the public system may provide market data 120 to the public at large to facilitate and/or reflect past, current, and/or predict future market participation. As discussed above, a business organization may desire to monitor and/or analyze the operation of the public system 110. For example, a business organization may provide a network (e.g., the business organization network 103) to facilitate the creation and/or to facilitate communication of metrics and/or analytics that may allow the business organization to better understand, for example, a financial market.

Figure 2:
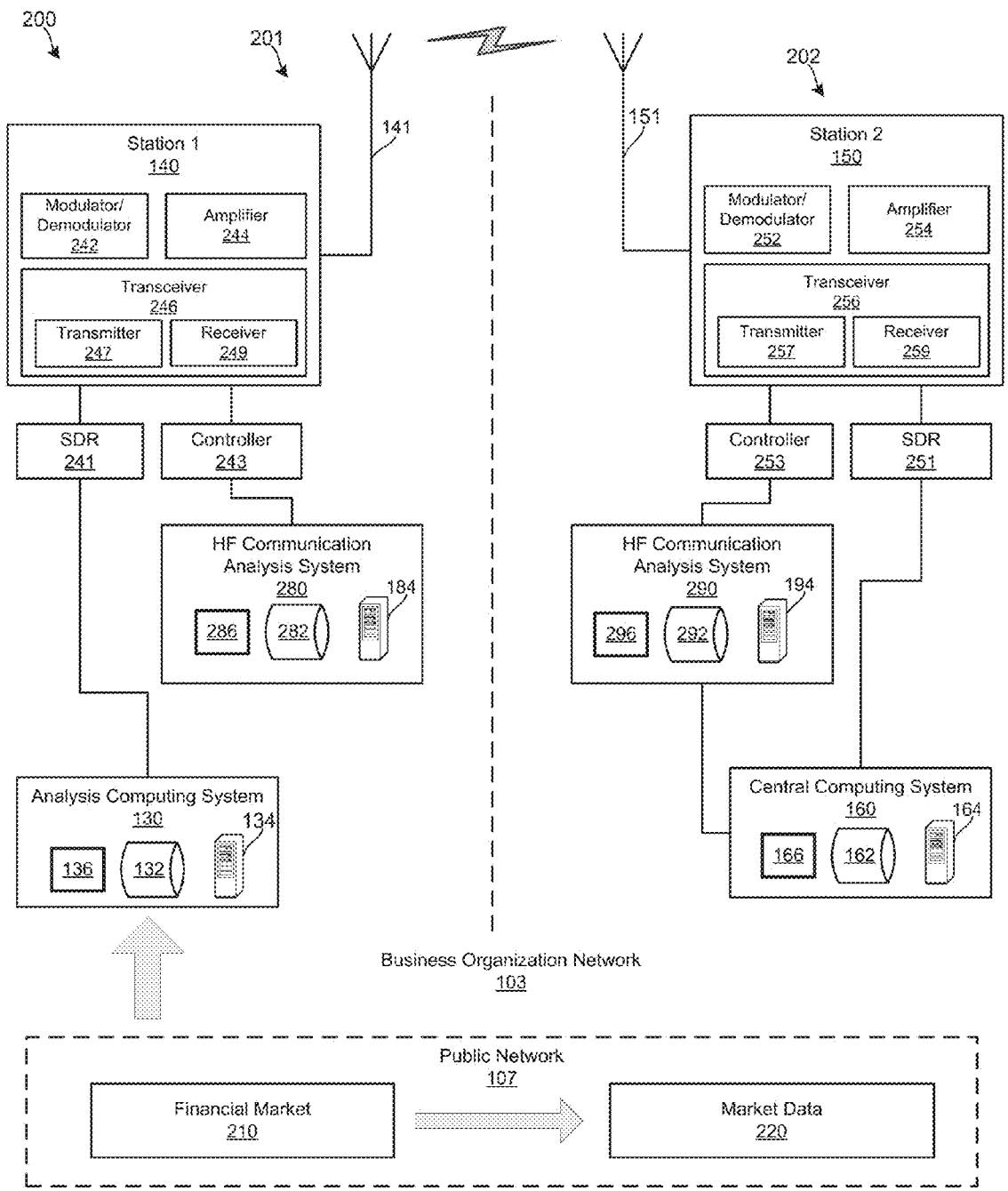
FIG. 2 shows another illustrative system for communicating business metrics via a HF radio wave communication network according to some embodiments.

In many cases, the business organization may create and/or use the metrics and other analytics at two or more different sites. For example, the business organization may have a first facility at a first geographic location near a first financial market and a second facility at a second geographic location near a second financial market. In some cases, the business organization may process and/or analyze metrics from one or more financial markets at a central location, such as by using a central computing system 160 to further analyze the metrics and/or analytics. When transferring information between locations, the business organization may desire to optimize one or more variables associated with the communication of data, such as optimizing communication speed, throughput, data accuracy, and/or the like. In some cases, the speed at which information may be communicated within the business organization's network 103 may give the business organization an advantage over one or more competitors. As such, the business organization may desire to emphasize speed over other communication parameters, such as by optimizing latencies within the chosen communication method. For example, according to embodiments discussed herein, an HF radio communication network may be chosen for the speed at which data can be communicated (e.g., minimum latency, 9600 baud, 4800 baud, 2400 baud, 1200 baud, etc.), while de-emphasizing other communication parameters such as throughput (e.g., a data length such as 16 bytes, 8 bytes, 1 byte) and/or reliability. In the illustrative example, the HF communication network may include at least one HF radio station 140 that may be used to at least transmit information to a second HF frequency radio station 150 via the antennas 141, 151. In some cases, the data communication rate may be determined as a function of a maximum possible data rate, a time of day, a signal strength, a signal reliability and/or one or more other variables such as a length of data to be transferred. For example, actual data rate may equal (max data rate)*signal reliability (percentage), where a calculated signal reliability of 78% may result in a baud rate near 75% of maximum possible FIG. 2 shows another illustrative system 200 for communicating business metrics via a HF radio wave communication network according to some embodiments. As with FIG. 1, the public network 107 may include a financial market 210 that may normally provide market data 220 to investors, institutions, media outlets and the like. A business organization may use the business organization network 103 to communicate information between two or more geographic locations 201, 202. In some cases, at least one of the geographical locations 201, 202 may be near a location of the financial market 210. In some cases, the business organization network may include different business facilities near each of a plurality of financial markets and/or other locations. For example, the business organization may include facilities near the financial markets in London, Frankfurt, Tokyo, New York and Chicago, to name a few. The business organization may also include one or more data processing computer systems 130, 160 that may be used to analyze an operation of one or more financial markets (e.g., the analysis computing system 130) and/or to process metrics produced by such an analysis (e.g., the central computing system 160).

In some cases, the analysis computing system may include a data repository 132, one or more computing devices 134 (e.g., servers, workstations, etc.) and/or one or more user interface devices 136. In some cases, the data repository may be configured to store instructions, that when executed by the one or more computing devices 134 to analyze activity and/or operation of a financial market. For example, the computing devices 134 may be configured to produce metrics useful to the financial institution when calculating and/or mitigating risks associated with financial market. In some cases, the metrics and/or other analytics may be stored locally in the data repository 132 or other similar data storage devices. In some cases, a user may be able to program, monitor the analysis of the financial market operation via the user interface device(s) 136. In some cases, the user may configure the analysis computing system 130 to communicate the metrics to one or more different computing systems, such as the central computing system 160, via a communication network, such as a HF radio communication system.

For example, the illustrative HF radio communication system of system 200 may include the first HF radio station 140 and its associated antenna 141, and the second HF radio station 150 and its associated antenna 151. The HF radio stations 140, 150 may include the same and/or similar components, such as a modulator/demodulator 242, 252, one or more amplifiers 244, 254 (e.g., linear amplifiers, etc.), and a transceiver 246, 256 that may include both a transmitter 247, 257 and a receiver 249, 259. In some cases, one or more of the radio stations may include a subset of the functionality, such as by including only a transmitter in a transmitting station and a receiver at a receiving station. In some cases, a software defined radio 241, 251 may be used to facilitate data communication between the geographic areas 201, 202 by the HF radio communication system.

As discussed above, operation of HF radio communication systems (e.g., propagation of the communicated HF signals) may be dependent on a number of factors, not least of which may include weather conditions (e.g., rain, snow, sun, etc.), environmental conditions (e.g., dust, etc.), and/or solar activity (e.g., solar storms, sunspots, etc.). Other factors may include, a time of day, whether the transmitting or receiving stations are in sunlight or darkness, proximity of a transmitter or receiver to a solar terminator (e.g., a duration of twilight between night and day), the current season, a sunspot cycle, other solar activity and/or whether polar aurora activity is present. In some cases, the HF communication analysis system 280, 290 may be used to control the operation of a controller 243, 253 controlling the HF radio station 140, 150, respectively. In some cases, the HF communication analysis system 280, 290 may monitor weather and/or environmental conditions, solar activity, time of day, and/or other factors in determining a control strategy to optimize latency over the communication network at or near a latency associated with physical propagation delays associated with physical limitations associated with HF radio wave communication. In some cases, the control strategy may include determining an amount of effective radio power (ERP) in the communication system, determining a bandwidth and/or selecting a band within the HF radio frequency band at which to communicate based on one or more of the above mentioned factors. In some cases, the selected band within the HF radio frequency band may be limited to a subset of frequencies within the HF radio band, such as a range from about 3 MHz to about 21 MHz.

Figure 3:
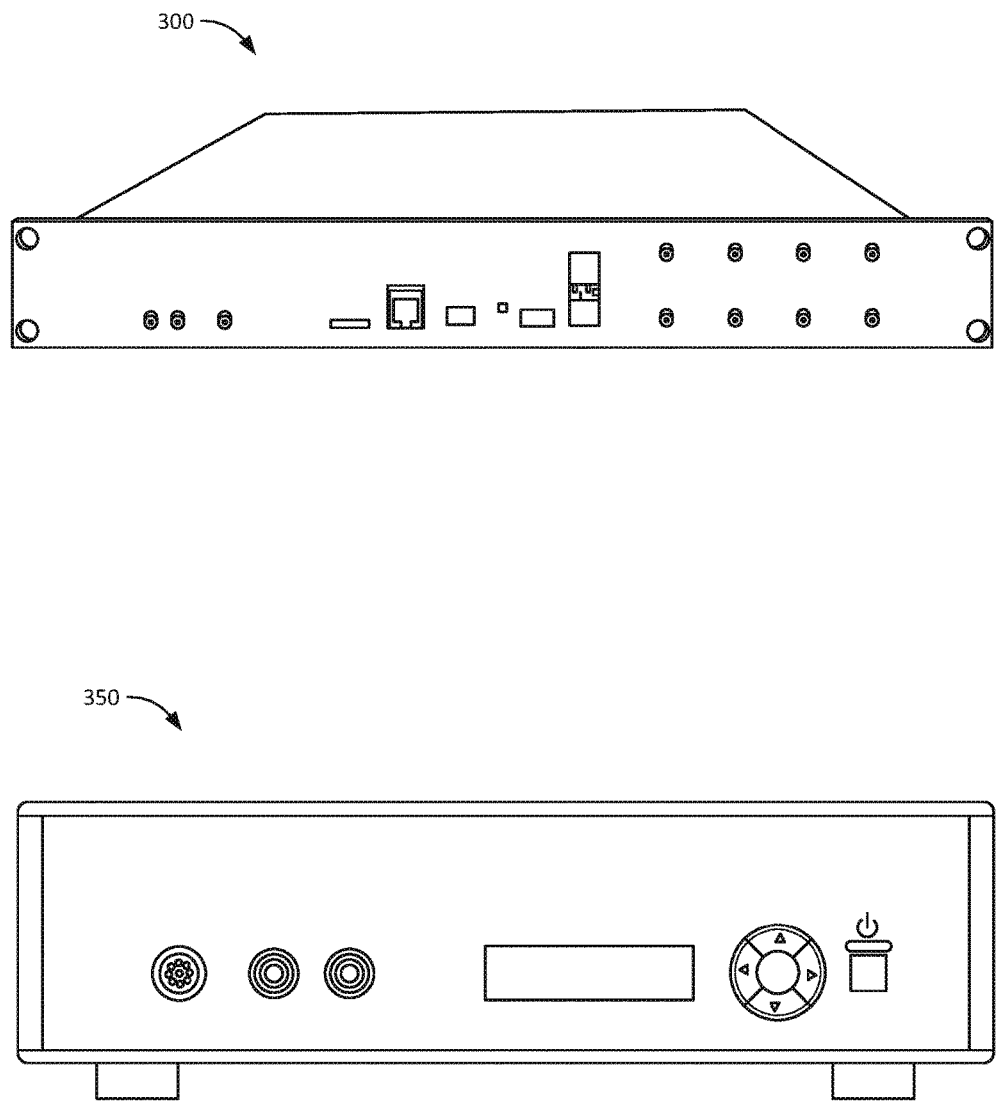
FIG. 3 shows illustrative software defined radios (SDRs) that may be used for HF radio wave communication according to some embodiments.

FIG. 3 shows illustrative software defined radios (SDR) 300, 350 that may be used for HF radio wave communication according to some embodiments. In some cases, the illustrative SDR may be configured to communicate (e.g., transmit and/or receive) radio signals over a range of frequencies, including the HF range mentioned above. For example, the SDR may be capable of communicating over frequencies from about 10 kHz to over 1 GHz. In some cases, the transceiver may be capable of operating at half-duplex and/or full duplex communication modes. The SDR may be capable of taking over 10 million samples per second, where the samples may include 8-bit quadrature samples. The SDR may be compatible with one or more different radio communication protocols (e.g., SDR#, etc.) In some cases, the message protocol size may be limited to a data size less than or equal to 15 bytes (e.g., 15 bytes, 8 bytes, 4 bytes, etc.). In some cases, the transmitters and/or receivers may be software configurable (e.g., gain, baseband filter, etc.). In some cases, a signal to noise ratio (SNR) may be better than a specified threshold value (e.g., 22 dB, 20 dB, etc.). The hardware and or software utilized in the SDR may be open-source or proprietary, or may include a combination of open-source and/or proprietary components. The SDR may include a GPS stabilized clock for synchronizing one or more devices. In some cases, for example, a synchronization signal (e.g., a time parameter, a status byte, a handshake bit, etc.) may be communicated between the transmission site and the receive site as part of the communicated information. In other cases, the SDR may include one or more clock inputs/outputs for receiving/providing a synchronization clock to the system 200. The SDR may also include one or more I/O ports to facilitate communication with other components of the system, where the I/O ports may include one or more USB ports, RS-422 ports, RS-232 ports, RS-485 ports, and/or custom pin headers, and/or the like.

Figure 4:
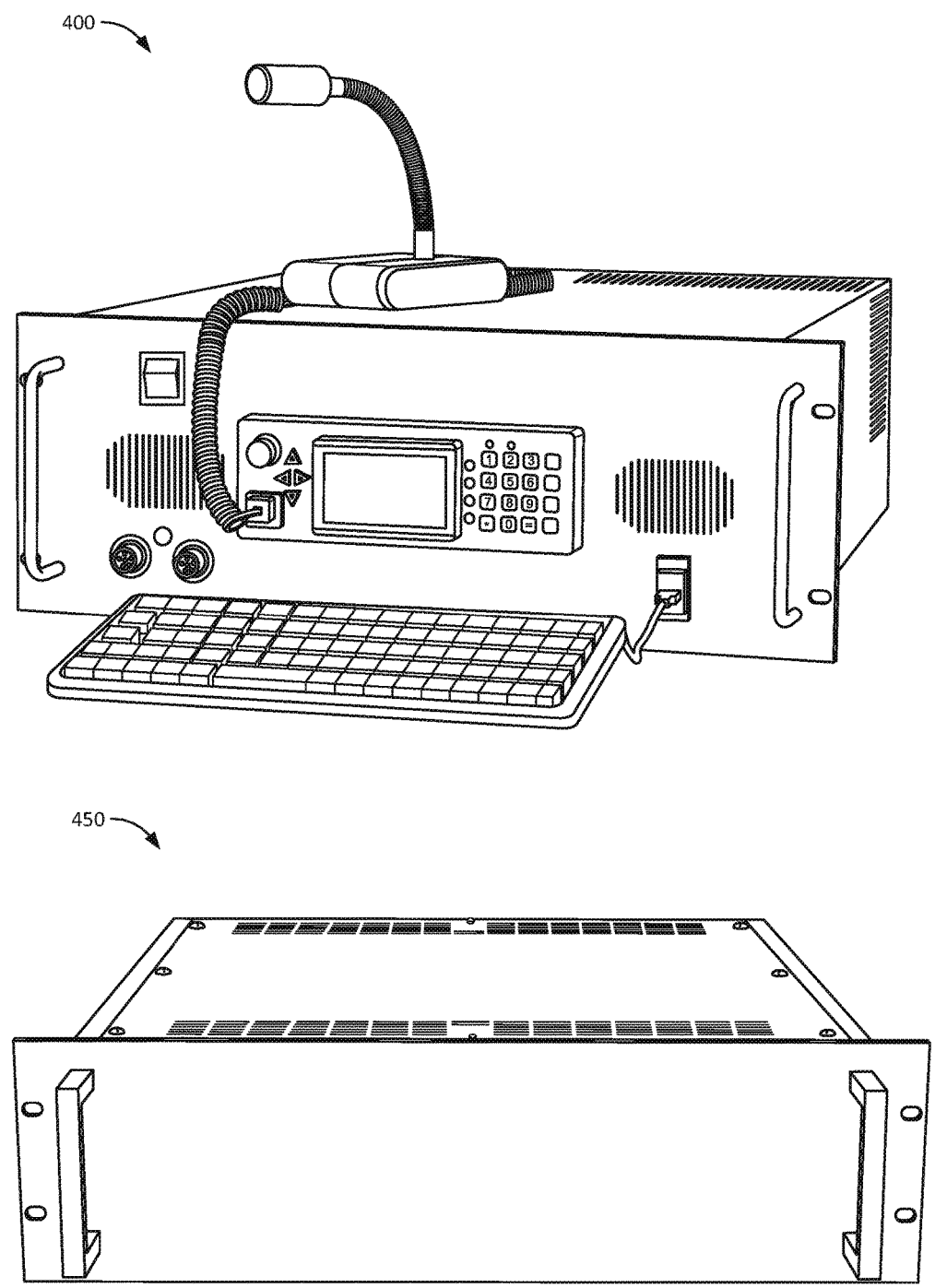
FIG. 4 shows illustrative HF radio wave transceivers that may be used for HF radio wave communication according to some embodiments.

FIG. 4 shows illustrative HF radio wave transceivers that may be used for HF radio wave communication according to some embodiments. In some cases, the illustrative transceivers may be capable of configuring a transmit power between a range of about 10 Watts to over about 100 Watts. In some cases, the transceiver may operate with a large transmit power range which may exceed 8 kW ERP or a smaller transmit power range which may be less than 3 kW ERP. In some cases, the transmit frequencies may be between about 5 kHz and about 30 MHz. For example, the transmission frequencies may be configured to operate within one or more ranges of frequencies, such as from about 5000-10000 kHz, 10000-12000 kHz and 12000-18000 kHz and 20000-23000 kHz. For example, these four illustrative frequency ranges may be necessary to adjust to changing ionospheric propagation conditions typical of long range communications. In some cases, the transmission frequencies may be selected within a range of a determined maximum usable frequency and a lowest usable frequency, dependent on one or more environmental, atmospheric, and/or other conditions along the transmission path between a transceiver and a receiver.

Radio waves may propagate near the ground in ground-wave communication or may be transmitted towards the ionosphere as sky-waves. The ionosphere may have one or more regions that affect the propagation of HF radio waves including the so-called D region, E region, F1 region and F2 region. The E, F1, and F2 region may refract HF waves such that the waves travel back towards the earth. The D region and/or E region may absorb and/or attenuate at least a portion of the HF signal during transmission, particularly during the day. At night, the F2 region is the only ionosphere region affecting the HF wave during night time communication. In winter at a solar maximum, the F1 and F2 region may merge to form the F region. The F2 region is present 24 hours during the day, is the highest altitude and, as such, allows for the longest communication paths with the least amount of hops and usually refracts the highest frequencies in the HF range.

The ionospheric conditions may vary due to a number of conditions over a day, week, month, year, etc., such as the solar cycle, the seasons, a sky-wave path used, and one or more other conditions present during a day. Frequencies that may be refracted in the E and/or F1 regions may be higher in summer than in winter, however variations seen in the F2 region may be more pronounced near an equinox (e.g., March, September). Further, near a solar minimum the summer noon frequencies may be greater than those in winter. However, at solar maximum, the winter frequencies tend to be higher than summer frequencies. Variations may be seen in the highest frequencies refracted vertically from the E and F2 region at noon, e.g., day hemisphere and midnight, e.g., night hemisphere between the geomagnetic equator and poles. For example, at noon, with increasing latitude the solar radiation strikes the atmosphere more obliquely, so the intensity of radiation and the free electron density production decreases with increasing latitude. However, the F2 region frequencies peak approximately 15° to 20° north and south of the geomagnetic equator. This is due to an increased electron concentration at these latitudes caused by the interaction of electric currents and the magnetic field at the equator.

Daily variations may be seen as well. For example, at sunrise solar radiation produces electrons in the ionosphere such that the E and F1 regions may begin to refracting HF sky-waves, and higher frequencies may be supported by the F2 region. Maximum frequencies may be seen near noon, due to a peak in solar radiation, where the ionospheric conditions may cause the frequencies to gradually decrease.

HF signals using a sky-wave path and traveling through the D region may pass through the day hemisphere and may be proportional to the solar x-ray flux. Attenuation is therefore greatest at solar maximum and when sky wave refraction points are near the sub-solar region (i.e., noon longitudes, summer hemisphere) While absorption due to the D region may be greatest in summer, absorption can be anomalously high at times during winter for periods of days. Lower frequencies used with sky-wave communication paths passing through the day hemisphere are attenuated more than higher frequencies. Lower frequencies on such paths will generally have decreased signal strength, decreasing the chance of the signal being detected by the receiving system. Further, sky-wave paths that lie wholly within the night hemisphere do not experience D region attenuation, resulting in improved signal strength for the lower frequencies in the usable band. Around solar maximum, large solar flares may be more likely to occur to strongly ionize the D region and further increase absorption of HF sky waves travelling through the day hemisphere.

Increases in the absorption of HF sky-waves after a solar flare which may be termed a "fade-out" and may occur simultaneously with lower more highly attenuated and taking longer to return to pre-flare signal strength. The duration of fade-outs can vary between about 10 minutes to several hours depending on the duration and intensity of the flare, with about 20 minutes being usual. Large flares are more likely to affect the whole HF band.

Sporadic E may occur at altitudes ranging from about 90 to 140 km, that is, at E region altitudes. While the normal E region is controlled by solar EUV radiation, sporadic E is the result of wind shears, meteors and the like. The E region may be more significant for HF sky waves passing through the day hemisphere, where sporadic E may form day or night and may appear for a few hours then disperse. The horizontal extent of sporadic E is probably of the order of tens to a few hundreds of kilometers with a vertical depth of a few kilometers. The E region has an electron density that increases in the morning hours and decreases after noon. While sporadic E occurs at the same altitudes it can often have far greater electron density than the E region, and at times, the F region. Such high electron density allows sporadic E to refract quite high frequencies. On some (e.g., oblique) paths sporadic E with high electron density may cause the radio wave to be refracted from it rather than the higher F region. This may alter the sky wave's footprint location and size. In some cases, a sporadic E layer may be partially transparent and/or may allow transmission of the radio wave through to the F region or the ground (downwards wave); at other times sporadic E may refract (from either above or below) all the wave energy. A sporadic E layer that is partially transparent may lead to a weak or fading signal as the layer evolves (FIG. 1.9). Transmission to the receiver site may be blocked completely on oblique paths when the sporadic E screens the F region (wave travelling up) or the ground (wave returning to Earth).

HF signals may be communicated from a transceiver to a receiver in a number of ways including a ground wave, e.g., near the ground for short distances and may travel up to 100 km over land to about 300 km over water. A direct or line-of-sight wave may interact with the earth-reflected wave depending on terminal separation, frequency and polarization, while a sky wave may be refracted by the ionosphere, for all distances.

Another aspect of a radio signal passing through the ionosphere is that it can be circularly polarized with one mode being called the O-Mode or ordinary ray rotating in one direction and the other X-Mode or extraordinary ray rotating in the opposite direction. Such rays can take quite different paths dependent upon frequency. The primary effect of a magnetic field on a plasma is that the plasma becomes birefringent meaning it has two refractive indices at the same time. In some cases the high end of the shortwave band the path of these rays are very similar. At the low end they are not. As a result there can be significant advantage to using circularly polarized receiving antennas to establish reliable long range communications. In some instances such antennas will be used.

A usable frequency range may be defined as a range of frequencies between the MUF and the LUF and will vary over time. For a same sky-path at a particular time, higher frequencies may travel better than lower frequencies. These lower frequencies are generally refracted from lower altitudes in the ionosphere. The lowest frequency that may propagate on a sky wave path at a particular time is dependent on the ionization in the D region. Variations in D region ionization cause this lowest frequency to change over time. Each time a sky wave traverses the D region the signal strength decreases. Further, signal attenuation is greater at lower frequencies and sky-wave paths that lie completely within the night hemisphere may be able to use the lowest frequencies in the HF band since they are unaffected by the D region.

A hop length is the distance across the ground from where a sky-wave leaves the ground, is refracted once by the ionosphere, and returns to Earth. An upper limit of the hop length is set by the height of the ionosphere and the curvature of the Earth. At 0° elevation angle (horizontal), with E and F region heights of 100 and 300 km respectively, the maximum hop lengths are 2000 km (E region) and 4000 km (F region). For the same ionospheric heights, the maximum hop lengths decrease to 1800 km (E region) and 3200 km (F region) with an elevation angle of 4°. Distances between transmitting and receiving antennas greater than these maximum hop lengths may require more than one hop. For example, a distance of 6100 km will require at least four hops via the E region and two hops via the F region. In general, more hops may be required for larger antenna elevation angles. In contrast, the path length is the distance across the ground between two transceivers.

HF sky waves that pass through the day hemisphere may be refracted by the E or F regions. Further, the elevation angle of a propagation path via the F region may be similar to that of a propagation path via the E region (e.g., two hops via the F region and three hops via the E region), In some cases, an E layer screening may occur. If the operating frequency is low enough, the signal will propagate via the E region and if high enough the signal will penetrate the E region and propagate via the F region. Propagation via the F region, particularly for longer paths, is usually preferable since signal strength will normally be greater. For example, when the selected frequency is below the E region maximum usable frequency (EMUF) for the two hop E mode, the sky wave will travel via the E region (the wave is said to be screened from the F region). The wave will lose energy as it traverses the D region four times and reflects from the ground once. The wave will also be more highly absorbed in the D region due to the lower operating frequency. However, if the selected frequency is above the EMUF for the two hop E mode but below the F region maximum usable frequency (FMUF) for the one hop F mode, the wave will penetrate the E region and propagate via the F region. The wave will lose energy as it traverses the D region twice.

For non-co-located transceivers, at least three independent variables may be taken into account when evaluating propagation of the HF waves through the ionosphere, including frequency, the range (e.g., path length) and/or an antenna elevation angle. In some cases, when an elevation angle is fixed, the wave may be refracted higher in the ionosphere and the ground range may increase, as the frequency increases towards the MUF. At the MUF associated with a particular elevation angle of the antenna, a maximum range is reached, where frequencies above the MUF will penetrate the ionosphere. In cases, where a path length is fixed (e.g., a fixed location for a sending transceiver and a receiving transceiver), an HF wave may be refracted from higher in the ionosphere as the frequency is increased towards the MUF. To maintain the fixed length across the ground, the elevation angle must be increased as the frequency increases. At the maximum usable frequency, a "critical elevation" is reached, where this critical elevation angle for a particular frequency is a maximum elevation angle (MEA). IF the elevation angle is increased on that particular frequency past the MEA, the signal will penetrate the ionosphere. Further, at frequencies above the maximum usable frequency and/or at elevation angles at or exceeding the critical elevation angle, the HF signal will penetrate the ionosphere and not be reflected back. As elevation angles decrease, with a fixed frequency, the path length increases. Similarly, as the elevation angle increases, the path length decreases as the HF signal is refracted from higher in the ionosphere. If the HF signal returns when transmitted vertically into the ionosphere above the transmitting antenna, then no skip distance or skip zone around the transmitting antenna exists. However, if the wave penetrates the ionosphere above the transmitter, then as the elevation angle is increased, the range will be reduced. At some elevation angle, a critical elevation angle for this frequency may be reached. At elevation angles greater than this critical elevation angle a HF signal may penetrate the ionosphere which results in an area into which neither the sky wave nor ground wave can propagate; this region is called the skip distance or skip zone. Communications via the sky wave into the skip zone may be possible with the use of a lower frequency.

Skip zones associated with a transmitter may vary diurnally with the seasons, solar activity or other such conditions. In some cases, skip zones will be smaller in the day hemisphere, at a solar maximum and/or around solar equinoxes because the ionosphere is weaker during those times so that higher frequencies can be refracted. At night, times of solar minimums, and/or other times when the ionosphere is weaker, those higher frequencies may penetrate the ionosphere at a same antenna elevation angle, thus increasing the size of the skip zone. At an outer edge of the skip zone, signal strength may change significantly. For example, moving away from the transmitting antenna the signal strength may abruptly increase as a receiving antenna moves from within the skip zone into the sky wave's footprint. In some cases, side scatter may result in some of the sky wave propagating into the skip zone due to obstructions, such as mountains or other terrain outside the skip zone that may reflect the sky wave into the area.

At higher frequencies within the HF frequency range (e.g., about 27 MHz to about 30 MHz), such frequencies may be used for line-of-sight communication. As such mounting antennas as high as possible and free from obstructions (e.g., hills, tall buildings, etc.) may be desired. In some cases, such communication may be relayed over long distances via repeater stations (e.g., land based, water based, etc.). Solar activity and/or electrical storm effects may be minimized within this range however other users may cause interference particularly in densely populated areas. 27 MHz and the lower frequencies in the VHF band can, at times, propagate over large distances, well beyond the normal line-of-sight limitations. For example, in times near a solar maximum and/or during the day, the ionospheric F region will often support long range sky wave communications on 27 MHz and above, sporadic E layers can often refract 27 MHz (and lower frequency VHF) propagation over distances of about 500 to 1000 nautical miles (900 to 1800 km) in length particularly at mid-latitudes and/or during the daytime in summer. In some cases, 27 MHz (and VHF) can also propagate by means of temperature inversions (ducting) at altitudes of a few kilometers. Under such conditions, the waves may be gradually bent by the temperature inversion to follow the curvature of the Earth. Distances of several hundred nautical miles can be covered at such times.

In some cases, solar and/or atmospheric events may have an effect on HF communications. As such prediction of such events may be useful in determining communication frequencies, data rates, data lengths that may be used to minimize the effects of these events. In an illustrative example, daylight fade outs (e.g., sudden ionospheric disturbances) such as large solar flares may emit x rays which increase the ionization in the D region of the ionosphere causing greater than normal HF communication attenuation. When the flare is large enough, the whole HF spectrum may be compromised for a period of time. Such activity may occur during solar maximums. Here, only HF paths that pass through the day hemisphere are affected, where paths having a refraction point near the sub-solar region are most affected. Attenuation is greater for lower frequencies, which are the first to be affected and the last to recover. Higher frequencies may be less affected and may remain usable depending on the strength of a particular solar flare. These short wave fade-outs usually have a fast onset, where the signal strength decreases quickly over a short time (e.g., seconds, minutes, etc.) and may take a longer duration to recover. Such conditions may last from minutes to hours, where the duration of the short wave fade out may depend on the duration and x-ray output of the particular solar flare, the path of a sky-wave through the atmosphere (e.g., antenna elevation angle, path length, etc.) and/or the operating frequency. Other disturbances may include polar cap absorption events, where solar flares may cause such events in a winter polar zone (e.g., a zone of darkness) where strong solar flares may produce a D region even at night. Such effects may be avoided by relaying messages around a polar region during such events. Ionospheric storms may be caused by solar events (e.g., coronal holes, coronal mass ejections, etc.) that change the character of the solar wind structure, where the ionosphere may respond to the change in solar wind with a change in electron density and/or height in the F2 region. Such ionospheric storms may be characterized by a decrease in the electron density of the F2 region which may or may not be preceded by a short-term increase of electron density. This decrease, reduces the highest frequencies that may be refracted in the F2 region, the maximum usable frequencies. Further, the height of the F2 region increases during these events, which may alter the path length covered by a sky-wave. These storms may last days with high latitudes experiencing a greater effect from the storms. These storms may have a long duration and may require a use of lower operating frequencies during those times.

Figure 5:
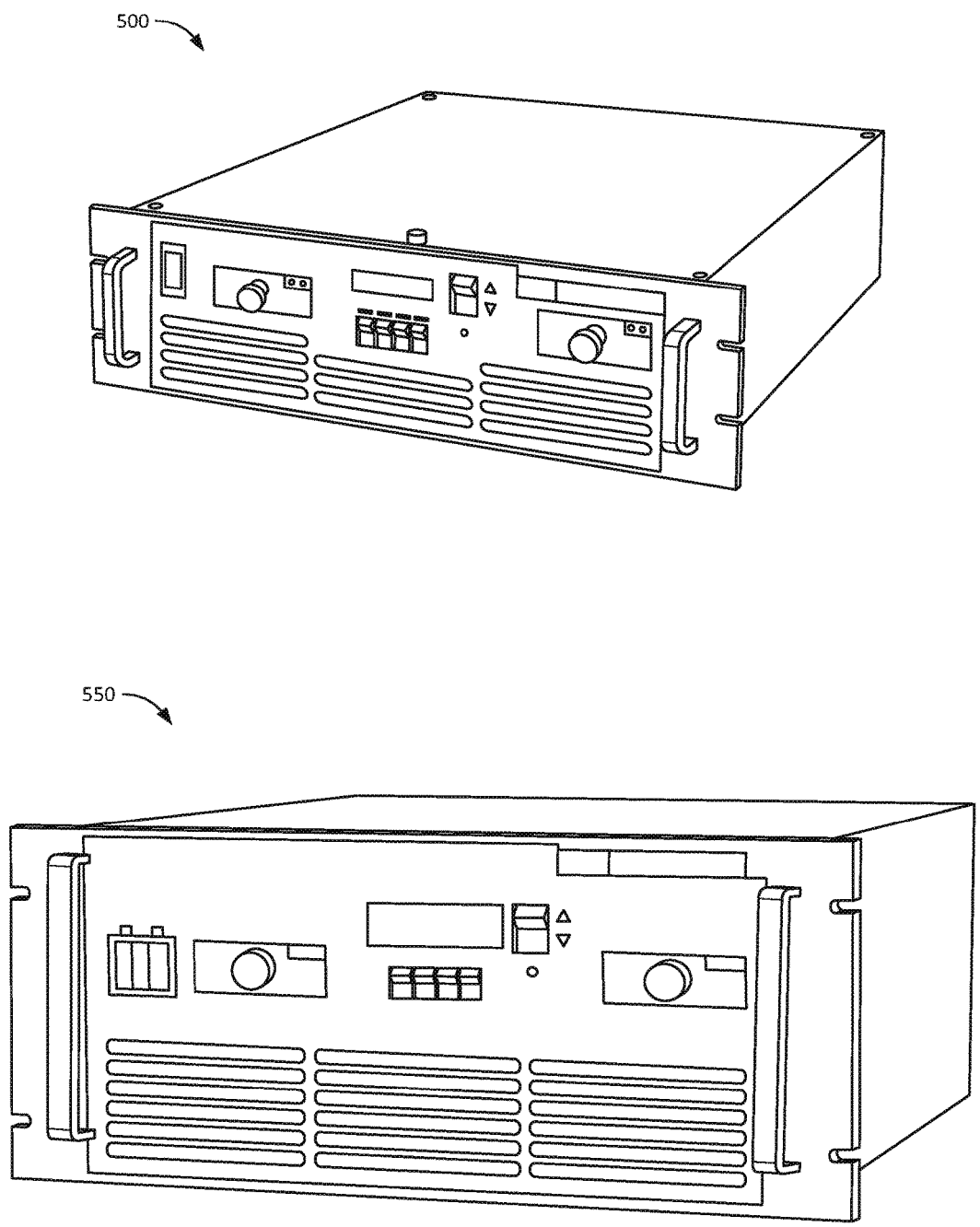
FIG. 5 shows illustrative HF radio wave amplifiers that may be used according to some embodiments.
Figure 6A:
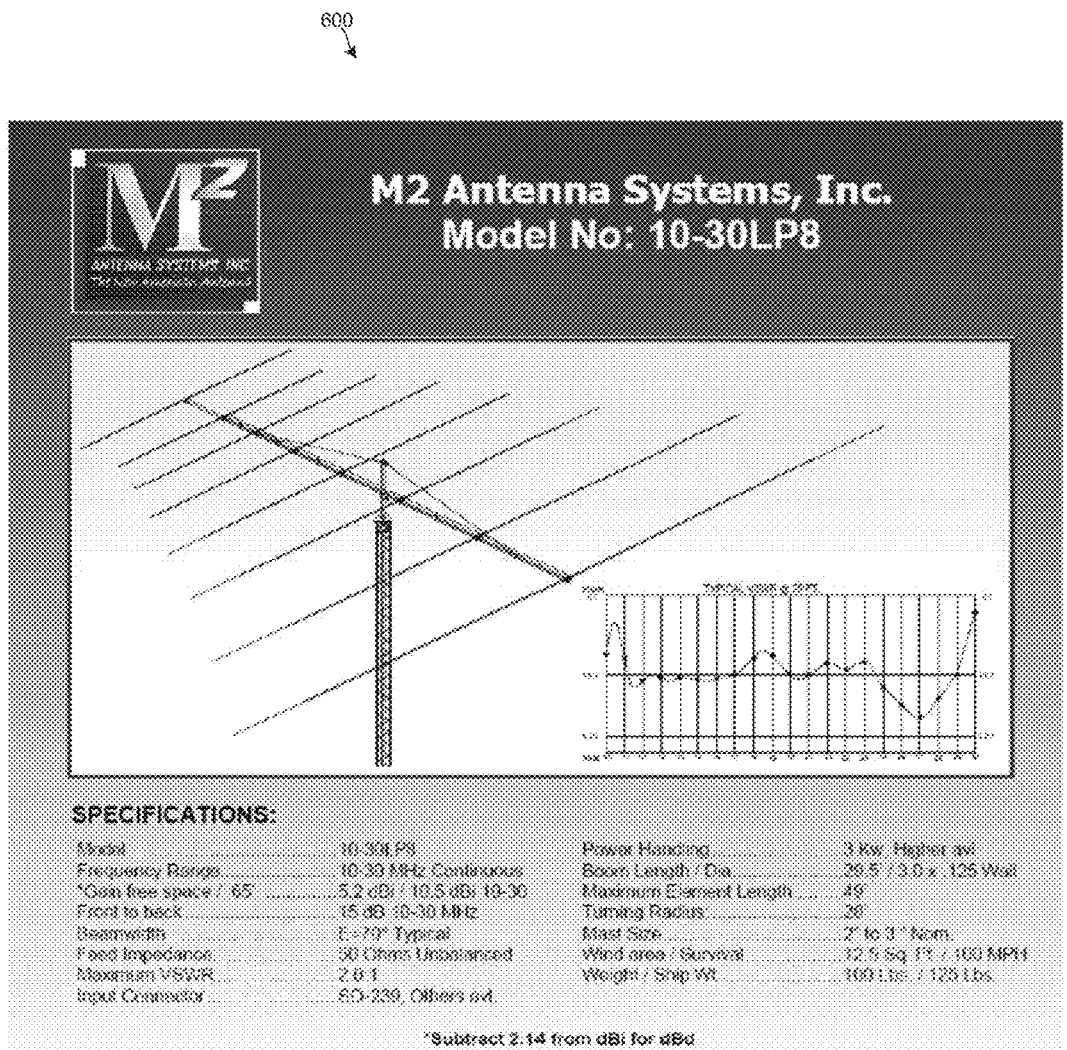
FIGS. 6A and 6B show illustrative antenna systems for HF radio wave communication that may be used according to some embodiments.
Figure 6B:
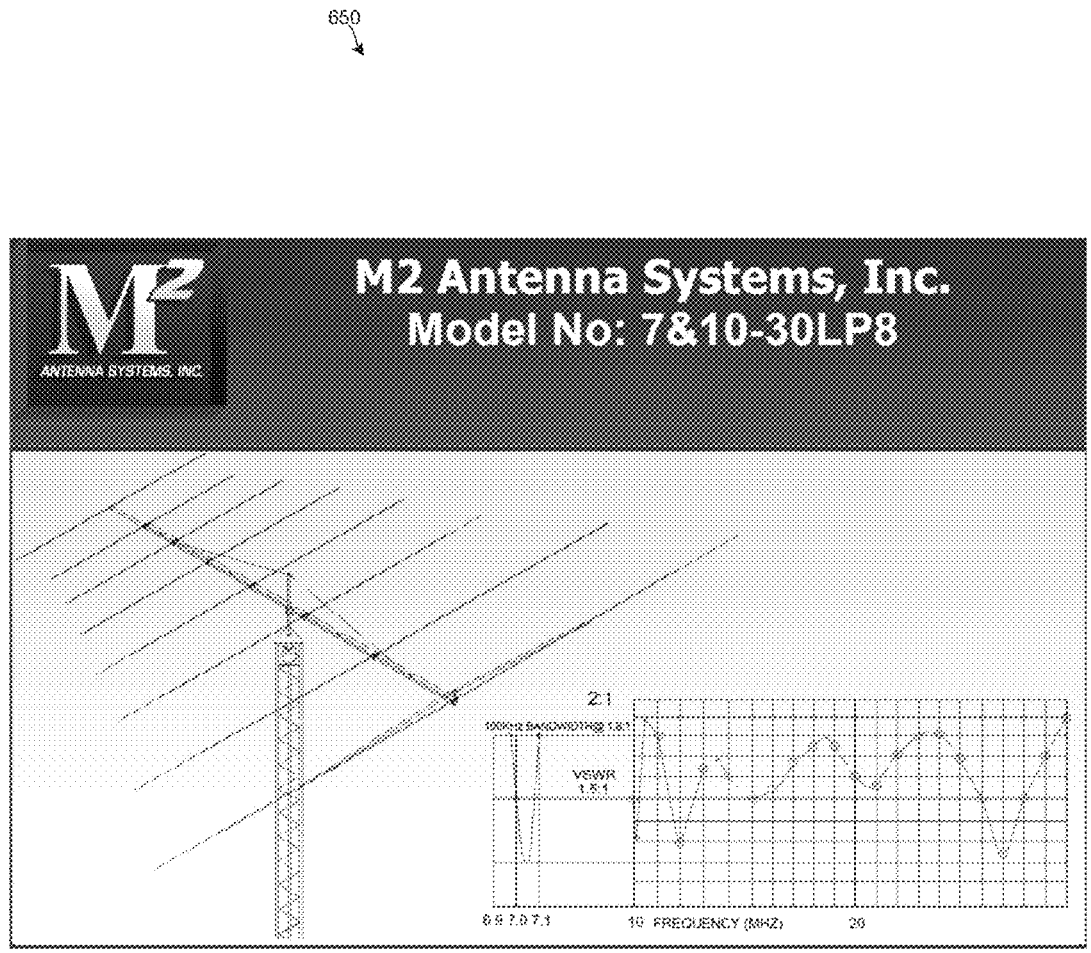

In some cases, the transmit bandwidth of the transceiver (s) may be adjustable, such as by choosing a bandwidth of between 3 kHz and 15 kHz, etc. Further, the modulation may be chosen from one or more modulation types, including binary phase-shift keying (BPSK), quadrature phase shift keying (QPSK), etc. FIG. 5 shows illustrative HF radio wave amplifiers 500, 550 that may be used according to some embodiments. For example, the amplifier 500 (e.g., a linear amplifier), may be chosen based on efficiency, reliability and/or one or more other factors. In some cases, the illustrative amplifier may be designed to include MOSFET, BJT, and IGBT technologies to allow for operation utilizing duty cycles of up to 100%. In some cases, the amplifier may be capable of operating with one or more modulation modes of operation, including frequency modulation (FM), amplitude modulation (AM), audio frequency shift keying (AFSK), and PSK modes of operation. FIGS. 6A and 6B show illustrative antenna systems 600, 650 for HF radio wave communication that may be used according to some embodiments. In an illustrative embodiment, the antenna may be a multi-element Yagi-type antenna having a gain of about 8 dBi, where the antenna feed may be defined as using 150' of RG213/U @ 1.08 dB/100' attenuation. In some cases, the antenna support structure may be a pre-existing structure or a custom designed structure. In an illustrative example, the antenna may be placed on a support structure, such as a self-support lattice tower of approximately 80' tall. In some cases, movement and/or adjustment of an elevation angle of an antenna (e.g., the antenna 241, 251, etc.) may be adjusted automatically in response to a control signal generated by a computer device, such as the controller 243 and/or the controller 253 in response to a determination of a transmission frequency.

Figure 7:
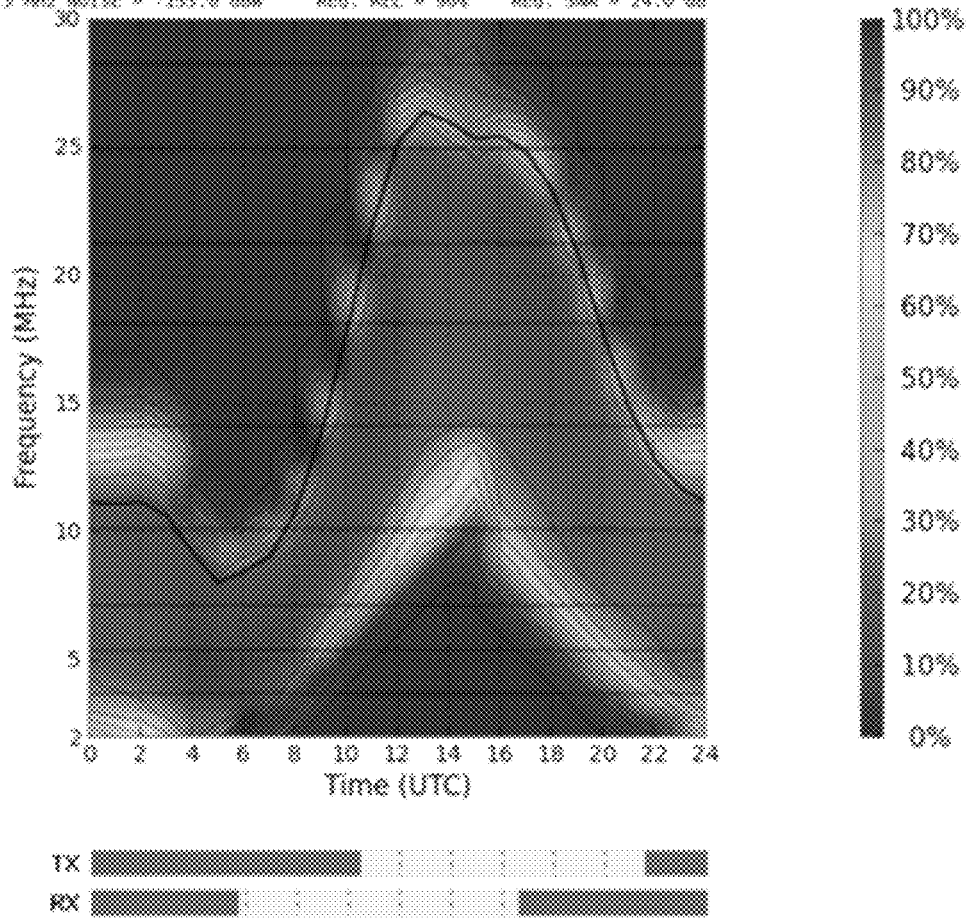
FIGS. 7 and 8 show illustrative charts corresponding to radio wave propagation reliability over time for an illustrative system according to certain embodiments.
Figure 8:
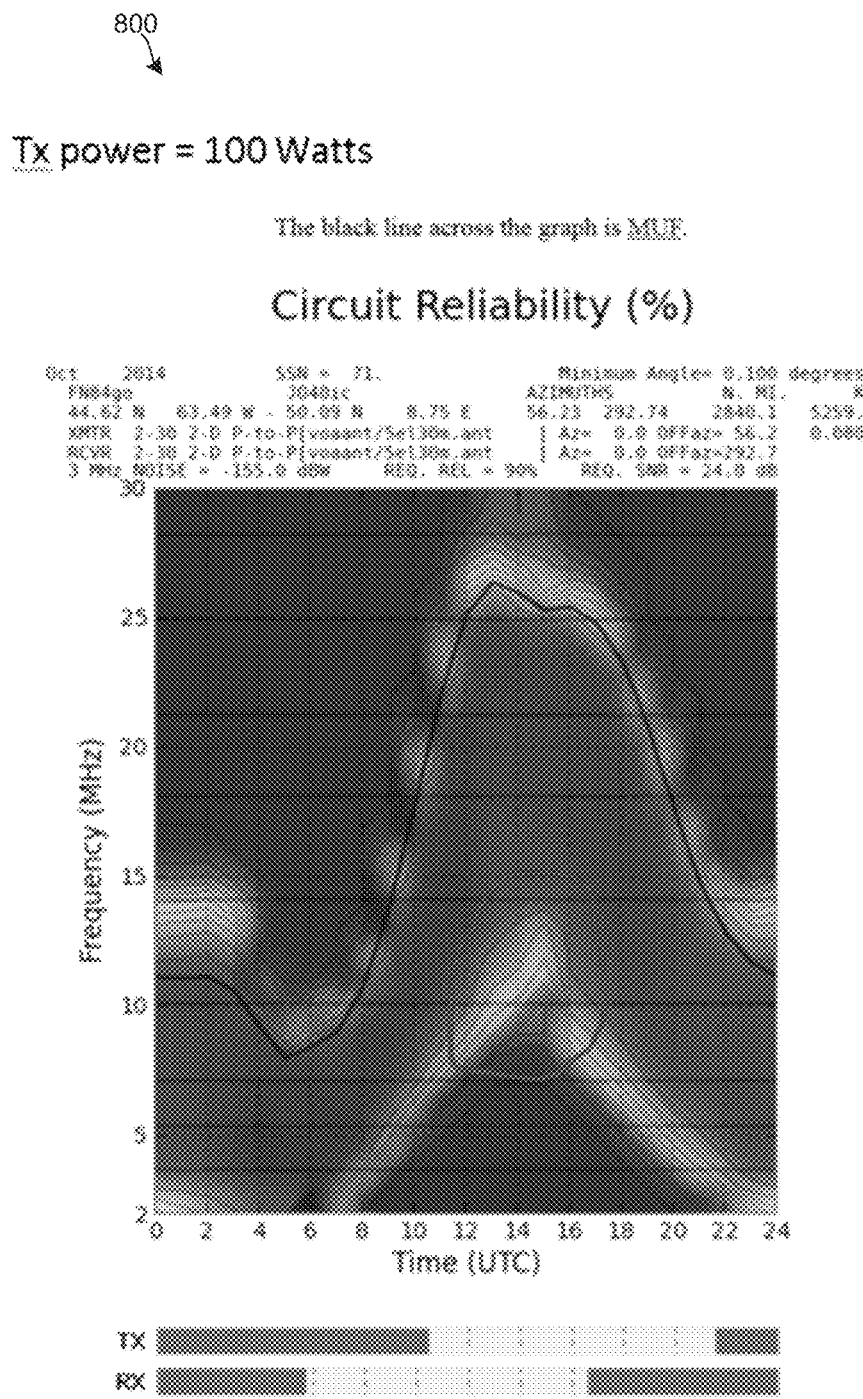

FIGS. 7 and 8 show illustrative charts corresponding to radio wave propagation reliability over time for an illustrative system according to certain embodiments. In some cases, a calculation for ERP may be calculated using an initial Transmit power of approximately 27 Watts (14.31 dBw), where a feeder line loss may equal 1.62 dB, the antenna gain may be 8.36 dBd. As such the ERP may be calculated as ERP=14.31−1.62+8.36=21.05 dBW (127 Watts). Note that the Transmit power may need to be increased to 100 Watts or more to improve the long range communication link reliability. In the illustrative FIGS. 7 and 8 a comparison of different transmit powers are analyzed to predict the reliability of the signal path. For example, these figures show an illustrative sample comparison of a typical link using 25 Watts vs 100 Watts Tx power is shown below where one can see the reliability of the signal path improves around the mid-day UTC time frame shown circled in blue.

Figure 9:
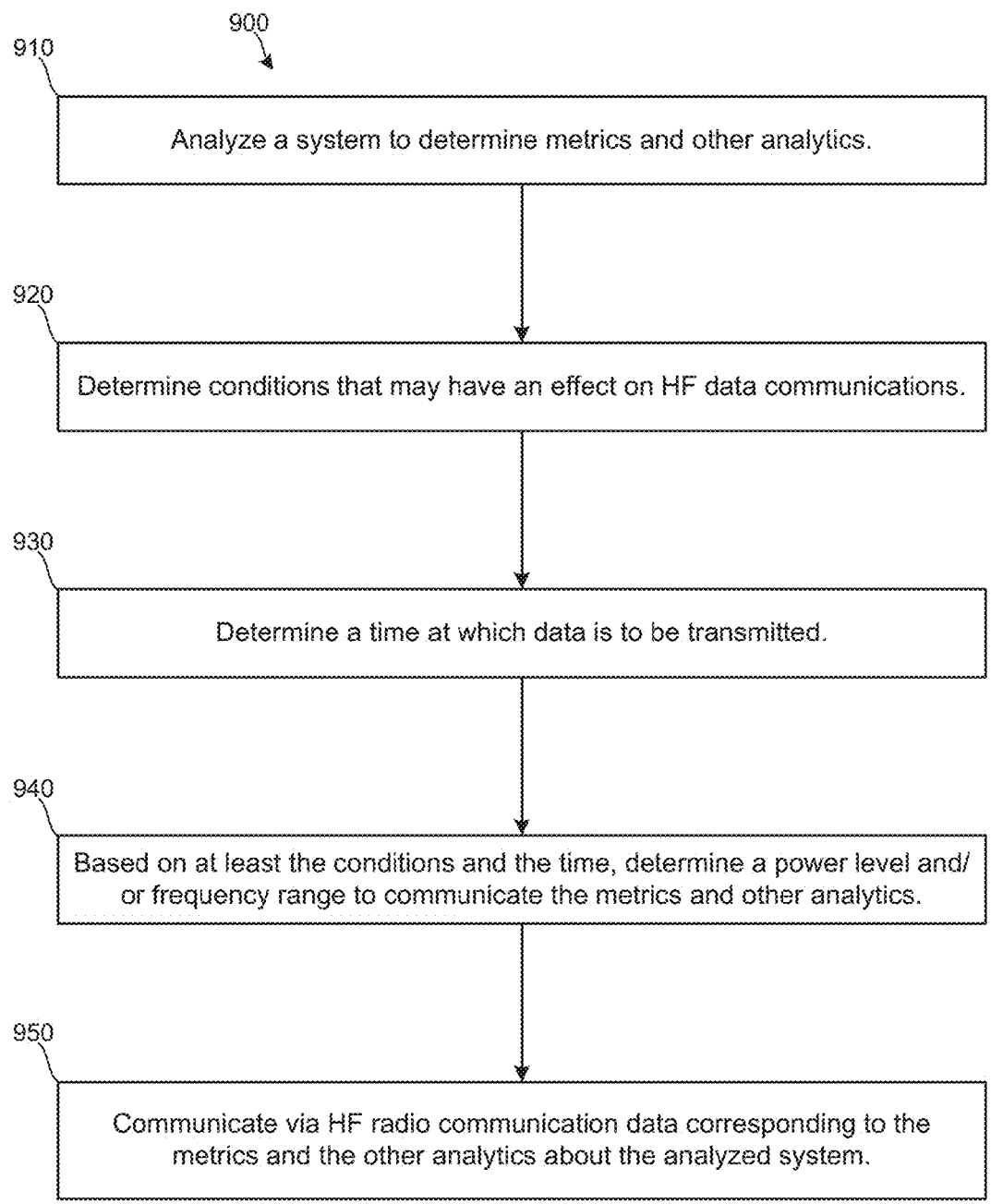
FIG. 9 shows an illustrative method for controlling HF radio wave communication to optimize latency according to certain embodiments.

FIG. 9 shows an illustrative method 900 for controlling HF radio wave communication to optimize latency according to certain embodiments. For example, at 910 a publicly accessible system (e.g., a financial exchange) may be analyzed to determine metrics and/or other analytics associated with the operation and/or utilization of the financial exchange at 920, the computing system may determine one or more conditions (e.g., environmental, weather, solar activity, etc.) that may have an effect on HF data communications. In some cases, such as at 930, a time at which data is to be generated may be monitored or observed. At 940, based at least on the conditions and the time, the controller 243 may determine a power level, a bandwidth, a power level, and the like, at which to communicate the metrics and/or other analytics within the business unit network. At 950, the system 200 may be configured to communicate via HF radio stations, the determined market data within the business communication network.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

In any of the above aspects, the various features may be implemented in hardware, or as software modules running on one or more processors. Features of one aspect may be applied to any of the other aspects.

There may also be provided a computer program or a computer program product for carrying out any of the methods described herein, and a computer readable medium having stored thereon a program for carrying out any of the methods described herein. A computer program may be stored on a computer-readable medium, or it could, for example, be in the form of a signal such as a downloadable data signal provided from an Internet website, or it could be in any other form.

For the avoidance of doubt, the present application extends to the subject-matter described in the following numbered paragraphs (referred to as "Para" or "Paras"):

Para 1. A method of communicating information over a low-latency communications network comprising:

analyzing one or more environmental conditions that have an effect on effective high frequency (HF) communication;

determining at least one of a power level, frequency band and a bandwidth at which to communicate information corresponding to a financial market within a business organization based on the analyzed environmental conditions to optimize latency over a HF radio communication network, and communicating business information between two geographical locations using the at least one of the determined power level, frequency band and bandwidth, wherein the business information comprises less than or equal to 16 bytes of information.

Para 2. The method of Para 1 wherein analyzing one or more environmental conditions includes:

receiving a prediction of communication reliability over a range of frequencies for a specified day; and determining a range of frequencies at which a predicted communication reliability is above a specified threshold.

Para 3. The method of Para 2 or Para 3, comprising selecting at least one frequency within the range of frequencies at which the prediction of communication reliability is above the specified threshold during business hours at a location corresponding to a transmission location.

Para 4. The method of any preceding Para, wherein a signal to noise ratio of communications broadcast over the HF radio communication network is less than or equal to a specified value.

Para 5. The method of any preceding Para, wherein the communicated business information comprises less than or equal to 4 bytes of information.

Para 6. A computing device for communicating information over a low-latency communications network comprising:

one or more processors; and at least one non-transitory memory device storing computer-readable instructions that, when executed by the processor, cause the computing device to:

analyze one or more environmental conditions that have an effect on effective high frequency (HF) communication;

determine at least one of a power level, frequency band and a bandwidth at which to communicate information corresponding to a financial market within a business organization based on the analyzed environmental conditions to optimize latency over a HF radio communication network, and communicate business information between two geographical locations using the at least one of the determined power level, frequency band and bandwidth, wherein the business information comprises less than or equal to 16 bytes of information.

Para 7. The computing device of Para 6 comprising:

an input/output (I/O) interface, wherein the at least one non-transitory memory device stores computer-readable instructions that, when executed by the processor, cause the computing device to:

identify an elevation angle for an antenna for use in the HF radio communication network; and output, via the I/O interface, a command signal to the antenna to position the antenna at the identified elevation angle.

Para 8. The computing device of Paras 6-7, wherein the at least one non-transitory memory device stores computer-readable instructions that, when executed by the processor, cause the computing device to:

receive a prediction of communication reliability over a range of frequencies for a specified day; and determine a range of frequencies at which a predicted communication reliability is above a specified threshold.

Para 9. The computing device of Paras 6-8, wherein the at least one non-transitory memory device stores computer-readable instructions that, when executed by the processor, cause the computing device to:

generate a command to broadcast a message over the HF radio communication network with a broadcast power of greater than 100 Watts Para 10. The computing device of Paras 6-9, wherein the at least one non-transitory memory device stores computer-readable instructions that, when executed by the processor, cause the computing device to:

generate a data container for broadcast over the HF radio communication network, wherein the data container comprises less than or equal to 8 bytes of data.

Para 11. A communications system for communicating messages over a high frequency (HF) network, comprising:

a computing device including a processor and a non-transitory memory device, wherein the non-transitory memory device stores computer-readable instructions that, when executed by the processor, cause the computing device to:

analyze one or more environmental conditions that have an effect on effective high frequency (HF) communication;

determine at least one of a power level, frequency band and a bandwidth at which to communicate information corresponding to a financial market within a business organization based on the analyzed environmental conditions to optimize latency over a HF radio communication network, and communicate business information between two geographical locations using the at least one of the determined power level, frequency band and bandwidth, wherein the business information comprises less than or equal to 16 bytes of information.

Para 12. The communications system of Para 11 comprising:

a first transceiver; and a first antenna electrically coupled to the first transceiver; wherein the first transceiver broadcasts, via the first antenna, a message over the HF radio communication network with a transmit power of at least 25 Watts.

Para 13. The communications system of Para 12 comprising:

a second transceiver at a different geographical location from the first transceiver; and a second antenna electrically coupled to the second transceiver; wherein the second receives, via the second antenna, the message transmitted over the HF radio communication network and wherein the receiver has a signal to noise ratio of at least 20 dB.

Para 14. The communications system of Paras 11-13 wherein the non-transitory memory device stores computer-readable instructions that, when executed by the processor, cause the computing device to:

generate a data container for broadcast over the HF radio communication network, wherein the data container comprises less than or equal to 8 bytes of data.

Para 15. The communications system of Paras 1-14 wherein the non-transitory memory device stores computer-readable instructions that, when executed by the processor, cause the computing device to:

identify an elevation angle for an antenna for use in the HF radio communication network; and output, via an I/O interface, a command signal to the antenna to position the antenna at the identified elevation angle.

The invention claimed is:

1. A method of communicating information over a low-latency communications network comprising:

analyzing one or more environmental conditions that have an effect on effective high frequency (HF) communication by generating two or more radio wave propagation reliability charts, wherein each one of the two or more radio wave propagation reliability charts is associated with a different power level;

determining a power level, a contiguous frequency band, and a bandwidth at which to communicate information corresponding to a financial market within a business organization based on the analyzed environmental conditions to optimize latency over a HF radio communication network, wherein the power level is between 10 W to 100 W and corresponds to the power level associated with the one of the two or more radio wave propagation reliability charts having the greatest reliability over a particular time duration of interest and wherein each contiguous frequency band corresponds to a defined band of at least 2 MHz within a HF radio wave communication band between 5 MHz and 30 MHz and the defined band is one of a first band from 5 MHz to 10 MHz, a second band from 10 MHz to 12 MHz, a third band from 12 MHz to 18 MHz, a fourth band form 20 MHz to 23 MHz, and a fifth band greater than 23 MHz; and communicating business information between two geographical locations using the determined power level, the contiguous frequency band and the bandwidth, wherein the business information comprises less than or equal to 16 bytes of information.

2. The method of claim 1 wherein analyzing one or more environmental conditions includes:

receiving a prediction of communication reliability over a range of frequencies for a specified day; and determining a range of frequencies at which a predicted communication reliability is above a specified threshold.

3. The method of claim 2, comprising selecting at least one frequency within the range of frequencies at which the prediction of communication reliability is above the specified threshold during business hours at a location corresponding to a transmission location.

4. The method of claim 1, wherein a signal to noise ratio of communications broadcast over the HF radio communication network is less than or equal to a specified value.

5. The method of claim 1, wherein the communicated business information comprises less than or equal to 4 bytes of information.

6. A computing device for communicating information over a low-latency communications network comprising:

one or more processors; and at least one non-transitory memory device storing computer-readable instructions that, when executed by the processor, cause the computing device to:

analyze one or more environmental conditions that have an effect on effective high frequency (HF) communication by generating two or more radio wave propagation reliability charts, wherein each one of the two or more radio wave propagation reliability charts is associated with a different power level;

determine a power level, one or more frequency bands and a bandwidth at which to communicate information corresponding to a financial market within a business organization based on the analyzed environmental conditions to optimize latency over a HF radio communication network, wherein the power level is between 10 W to 100 W and corresponds to the power level associated with the one of the two or more radio wave propagation reliability charts having the greatest reliability over a particular time duration of interest and wherein, each frequency band corresponds to a defined band of at least 2 MHz within a HF radio wave communication band between 5 MHz and 30 MHz and the defined band is one of a first band from 5 MHz to 10 MHz, a second band from 10 MHz to 12 MHz, a third band from 12 MHz to 18 MHz, a fourth band form 20 MHz to 23 MHz, and a fifth band greater than 23 MHz; and communicate business information between two geographical locations using the determined power level, a frequency band and a bandwidth, wherein the business information comprises less than or equal to 16 bytes of information.

7. The computing device of claim 6 comprising:
an input/output (I/O) interface, wherein the at least one non-transitory memory device stores computer-readable instructions that, when executed by the processor, cause the computing device to:
identify an elevation angle for an antenna for use in the HF radio communication network; and
output, via the I/O interface, a command signal to the antenna to position the antenna at the identified elevation angle.

8. The computing device of claim 6, wherein the at least one non-transitory memory device stores computer-readable instructions that, when executed by the processor, cause the computing device to:
receive a prediction of communication reliability over a range of frequencies for a specified day; and
determine a range of frequencies at which a predicted communication reliability is above a specified threshold.

9. The computing device of claim 6, wherein the at least one non-transitory memory device stores computer-readable instructions that, when executed by the processor, cause the computing device to:
generate a command to broadcast a message over the HF radio communication network with a broadcast power of greater than 100 Watts.

10. The computing device of claim 6, wherein the at least one non-transitory memory device stores computer-readable instructions that, when executed by the processor, cause the computing device to:
generate a data container for broadcast over the HF radio communication network, wherein the data container comprises less than or equal to 8 bytes of data.

11. A communications system for communicating messages over a high frequency (HF) network, comprising:
a computing device including a processor and a non-transitory memory device, wherein the non-transitory memory device stores computer-readable instructions that, when executed by the processor, cause the computing device to:
analyze one or more environmental conditions that have an effect on effective high frequency (HF) communication by generating two or more radio wave propagation reliability charts, wherein each one of the two or more radio wave propagation reliability charts is associated with a different power level;

determine a power level, one or more frequency band, and a bandwidth at which to communicate information corresponding to a financial market within a business organization based on the analyzed environmental conditions to optimize latency over a HF radio communication network, wherein the power level is between 10 W to 100 W and corresponds to the power level associated with the one of the two or more radio wave propagation reliability charts having the greatest reliability over a particular time duration of interest and wherein, each frequency band corresponds to a defined band of at least 2 MHz within a HF radio wave communication band between 5 MHz and 30 MHz and the defined band is one of a first band from 5 MHz to 10 MHz, a second band from 10 MHz to 12 MHz, a third band from 12 MHz to 18 MHz, a fourth band form 20 MHz to 23 MHz, and a fifth band greater than 23 MHz; and communicate business information between two geographical locations using the the determined power level, frequency band, and bandwidth, wherein the business information comprises less than or equal to 16 bytes of information.

12. The communications system of claim 11 comprising:
a first transceiver; and
a first antenna electrically coupled to the first transceiver; wherein the first transceiver broadcasts, via the first antenna, a message over the HF radio communication network with a transmit power of at least 25 Watts.

13. The communications system of claim 12 comprising:
a second transceiver at a different geographical location from the first transceiver; and
a second antenna electrically coupled to the second transceiver; wherein the second receives, via the second antenna, the message transmitted over the HF radio communication network and wherein the second transceiver is capable of detecting signals within a signal to noise ratio of less than 25 dB.

14. The communications system of claim 11 wherein the non-transitory memory device stores computer-readable instructions that, when executed by the processor, cause the computing device to:
generate a data container for broadcast over the HF radio communication network, wherein the data container comprises less than or equal to 8 bytes of data.

15. The communications system of claim 11 wherein the non-transitory memory device stores computer-readable instructions that, when executed by the processor, cause the computing device to:
identify an elevation angle for an antenna for use in the HF radio communication network; and
output, via an I/O interface, a command signal to the antenna to position the antenna at the identified elevation angle.

16. The method of claim 1, wherein latency is optimized over other parameters, such as throughput and reliability resulting in the latency being at or near a latency associated with physical propagation delays associated with physical limitations associated with HF radio wave communication.

* * * * *